United States Patent [19]

Graf et al.

[11] Patent Number: 5,536,513
[45] Date of Patent: Jul. 16, 1996

[54] FLAVORED FLOUR CONTAINING ALLIUM OIL CAPSULES AND METHOD OF MAKING FLAVORED FLOUR DOUGH PRODUCT

[75] Inventors: Ernst Graf, Longmont, Colo.; Jon C. Soper, Huber Heights, Ohio

[73] Assignee: Tastemaker, Cincinnati, Ohio

[21] Appl. No.: 422,705

[22] Filed: Apr. 13, 1995

Related U.S. Application Data

[63] Continuation-in-part of Ser. No. 204,755, Mar. 2, 1994, abandoned, which is a continuation of Ser. No. 859,934, Mar. 30, 1992, abandoned, and Ser. No. 859,349, Mar. 30, 1992, abandoned.

[51] Int. Cl.⁶ .......................... A21D 2/36; A23L 1/0562
[52] U.S. Cl. .............. 426/92; 426/94; 426/446; 426/573; 426/650; 426/653
[58] Field of Search ................ 426/94, 446, 573, 426/650, 653, 92

[56] References Cited

U.S. PATENT DOCUMENTS

| | | |
|---|---|---|
| 2,883,285 | 4/1959 | Lubig . |
| 3,537,863 | 11/1970 | Sinnott . |
| 3,537,866 | 11/1970 | Sinnott ........................... 426/21 |
| 3,615,679 | 10/1971 | Tangel . |
| 3,857,977 | 12/1974 | Huessy ........................... 426/650 |
| 3,965,033 | 6/1976 | Matsukawa et al. ................ 426/89 |
| 3,971,859 | 7/1976 | Huessy ........................... 426/650 |
| 4,394,394 | 7/1983 | Nava et al. . |
| 4,643,900 | 2/1987 | Porter ............................. 426/21 |
| 4,957,750 | 9/1990 | Cochran et al. . |
| 5,023,024 | 6/1991 | Kyogoku et al. ................... 426/98 |

FOREIGN PATENT DOCUMENTS 0455598  4/1991  European Pat. Off. .

*Primary Examiner*—Helen Pratt
*Attorney, Agent, or Firm*—Wood, Herron & Evans

[57] ABSTRACT

A allium flavored flour as well as to a method of making a flavored flour dough product. The allium flavored flour comprises flour and allium oil capsules formed by protein coacervation. The allium oil capsules are heat-stable and fracturable, and are added in an amount sufficient for flavoring when the flour is formed into a dough. Because the allium oil capsules are heat-stable, the allium oil does not affect the rheology of the dough during dough processing, baking or cooking and because the capsules are fracturable on chewing, the dough product provides a uniform and sustained allium flavor when eaten. The flavored flour or dough product further includes free allium material in an amount sufficient to reduce the mix time required to develop the dough and may be combined with the oil capsules in a customized blend to provide the desired level of flavor and affect on dough rheology.

17 Claims, 2 Drawing Sheets

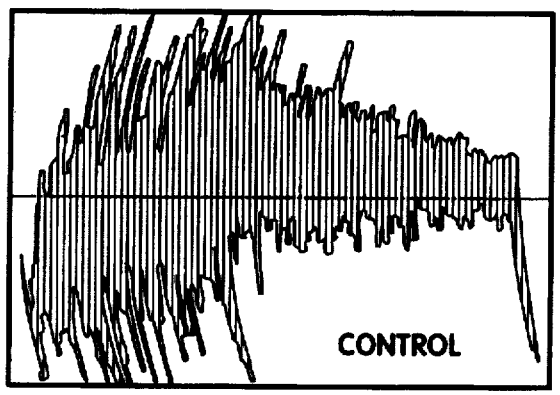
FIG. IA
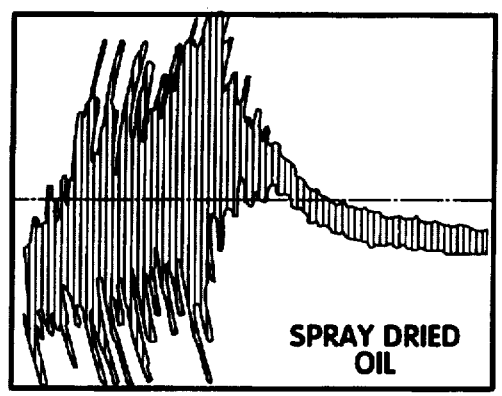
FIG. IB
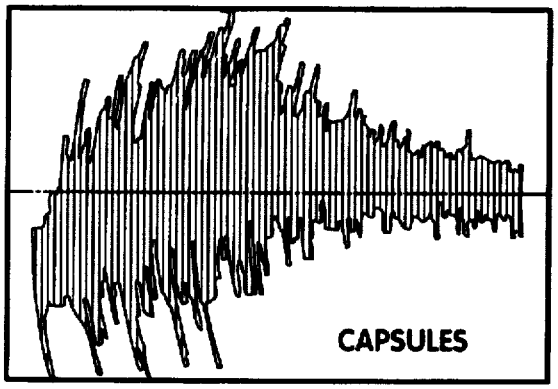
FIG. IC
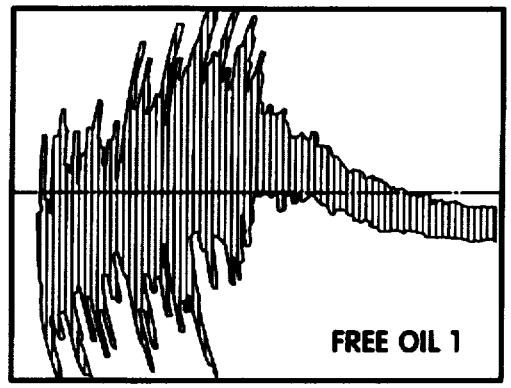
FIG. ID
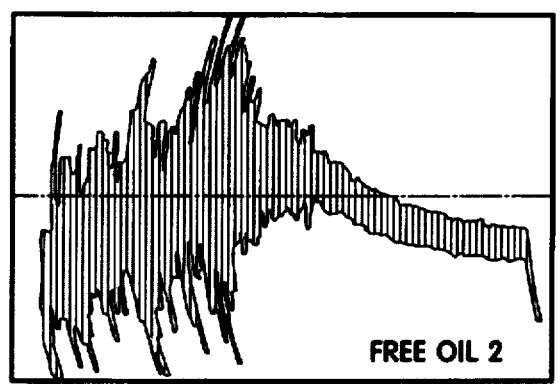
FIG. IE

FLAVORED FLOUR CONTAINING ALLIUM OIL CAPSULES AND METHOD OF MAKING FLAVORED FLOUR DOUGH PRODUCT

RELATED APPLICATION

This application is a continuation-in-part of application Ser. No. 08/204,755 filed on Mar. 2, 1994, entitled "Method of Flavoring Foods with Polymer Encapsulated Flavor Oils", which is a continuation of application Ser. No. 07/859,934 filed on Mar. 30, 1992 entitled "Aqueous Liquid Flavor Oil Capsules, Method of Making and Using in Foods", both now abandoned, and application Ser. No. 07/859,349 filed Mar. 30, 1992 entitled "Heat-Stable and Fracturable Spray-Dried Free-Flowing Flavor Oil Capsules, Method of Making and Using in Foods", also now abandoned.

FIELD OF THE INVENTION

This invention relates to flours and doughs and, more particularly, to flavored flours and flour dough products incorporating an allium oil to flavor the flour and dough and, optionally, to reduce the mix time required to develop the dough.

BACKGROUND OF THE INVENTION

Allium materials, such as garlic, onion, and the like, are popular ingredients for flavoring various foods and are used quite often in flavoring dough products. For example, Tangel et al. U.S. Pat. No. 3,615,679 teaches the use of garlic as an ingredient in a dough used for a frozen pizza. U.S. Pat. No. 3,537,863 to Sinnott teaches a method of making garlic bread in which dehydrated garlic chips are blended into the bread dough at the time of kneading. The garlic chips are activated by vapor generated in the dough during baking in order to create a garlic flavor perception.

Allium materials also react with dough, affecting dough rheology and finished product performance. For example, the moderate degree of unsaturation and large level of sulfhydryl compounds present in garlic give the garlic a high chemical reducing potential such that, when the garlic is combined with the dough, the garlic reduces the disulfide cross links of gluten in the dough. This reducing potential enables garlic to be used as a dough conditioner, reducing the mix time required to develop a dough as well as increasing the extensibility of the dough, as recognized in Porter U.S. Pat. No. 4,643,900 (the '900 patent). The '900 patent teaches the use of an allium material, such as flavorless dehydrated garlic or onion, in an effective dough conditioning amount.

However, garlic's reducing potential also produces some usually undesirable dough processing problems such as decreased mix tolerance, reduced gas-holding capacity and sticking to the sheeting line. The garlic also has an adverse effect on finished product performance, as evidenced by decreased loaf volume, oxidized bread crumb, uneven grain and some toughness.

Therefore, it is desirable to have a dough product which provides a garlic flavor without affecting the dough rheology, processing or finished product performance of the dough. It is also desirable to have a dough product in which garlic may be incorporated to provide both garlic flavor and reduced mix time.

SUMMARY OF THE INVENTION

This invention is directed to an allium flavored flour as well as to a method of making a flavored flour dough product. The allium flavored flour comprises flour and protein-encapsulated allium oil capsules formed by coacervation. The allium oil capsules are heat-stable and fracturable, and are added in an amount sufficient for flavoring when the flour is formed into a dough.

If desired, the flavored flour may include a chemical leavening system. Also, free allium material may be provided in a mixture with the flavored flour in an amount sufficient to reduce the mix time required to develop a dough. The free allium material may be combined with the oil capsules in a customized blend to provide the desired level of flavor and effect on dough rheology.

The allium oil or free allium material may be any allium, such as garlic, onion, chive, leek, shallot, scallion and the like, and preferably is garlic. Furthermore, the free allium material may be supplied in any of a number of different forms, such as, for example, an oil, oleoresin, extract, essence or puree.

The method of making an allium flavored flour dough product includes mixing flour, allium oil capsules and water for a time sufficient to develop a dough, whereby the allium oil does not substantially affect the rheology of the dough. If desired, yeast or a chemical leavening system may be added. Because the allium oil capsules are heat-stable, the allium oil does not affect the rheology of the dough during dough processing, baking, or cooking. Furthermore, because the capsules are fracturable upon chewing, the dough product provides a uniform and sustained allium flavor when eaten.

One of the advantages of the invention is that encapsulated allium oil may be used to provide a uniform and sustained flavor to dough products, without affecting dough rheology or finished product performance where such a result is undesirable. Another benefit of the invention is that dough rheology may be intentionally affected in a controlled manner by using customized blends of free allium material and encapsulated allium oil in the dough product. These blends allow flavoring of the dough and controlled reduction in mix time without causing dough processing and finished product performance problems. Yet another benefit of the invention is the reduced flavor and aroma contamination in large dough plants housing multiple sheeting lines.

DETAILED DESCRIPTION OF THE INVENTION

Figure 2:
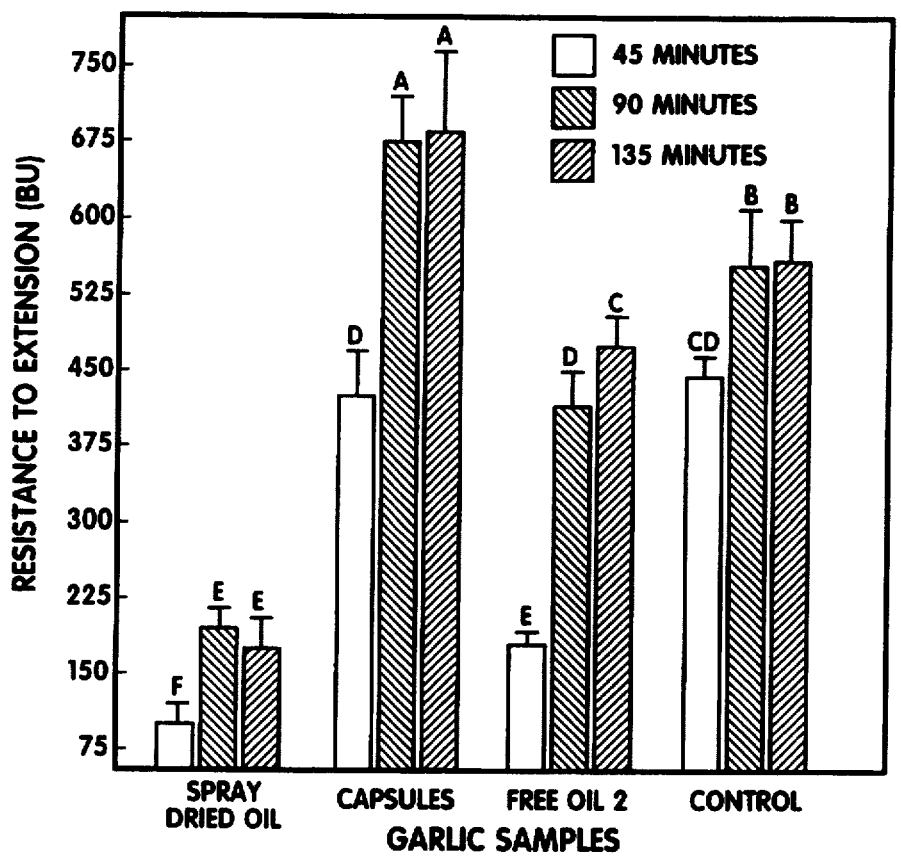

Allium flavored flours produced according to the invention include flour, allium oil capsules and, if desired, a chemical leavening system. Dough products produced according to the invention include flour, allium oil capsules and, if desired, yeast or a chemical leavening system for raising the dough.

As used herein, the term "allium" refers to any member of a large genus of bulbous herbs of the lily family. Nonlimiting examples include garlic, onion, chive, leek, shallot, and scallion.

The term "chemical leavening system" refers to various combinations of chemical leaveners. For example, $CO_2$-generating chemicals such as sodium bicarbonate may be used, usually in combination with a leavening acid or acids which acidify the sodium bicarbonate to generate $CO_2$ gas. Various combinations of slow and fast acting acids may be used, such as for example, sodium acid pyrophosphate (slow) or mono calcium phosphate (fast). For thin dough products, such as cookies, crackers and the like, ammonium bicarbonate may be used to generate $CO_2$, in which case a leavening acid may not be needed.

In addition, other ingredients may be used as is normal in preparing dough products. These ingredients include, for example, shortenings, milk, sugar and salt, as well as other ingredients used to adjust the flavor or consistency of the dough product.

The allium oil capsules are formed by protein coacervation and are both heat-stable and fracturable. "Heat-stable", as that term is used herein, means that the capsules remain intact and release no free flavor in microwave, baking, frying and other cooking or heating applications where temperatures are achieved over a range of about 140° F. to about 450° F. The term "fracturable" means that, upon chewing, the allium oil capsules provide uniform and sustained release of flavor oil. The allium oil capsules may be prepared according to the method for microencapsulating flavor oils taught in application Ser. No. 08/204,755 filed on Mar. 2, 1994, now abandoned, entitled "Method of Flavoring Foods with Polymer Encapsulated Flavor Oils", which is incorporated herein in its entirety by reference.

The microencapsulation method involves encapsulating discrete droplets of emulsified flavor oil by coacervation in water. During coacervation, a polymeric (i.e., a protein) coating over the discrete droplets is formed to produce microencapsulated flavor capsules. The polymeric or protein coating is then cross linked by covalent or ionic bonding with a cross linking agent in the water. The capsules also may be spray-dried, or otherwise dewatered, at a temperature suitable for the removal of water to produce heat-stable and fracturable free-flowing solid flavor capsules.

By employing the method of this invention, allium oil in an amount of up to 95% by weight, within the range of about 50% to 95% by weight, is encapsulated in a polymeric coating material, i.e., at a ratio of about 19:1 to about 1:1 of oil to coating. In another feature of the invention, a drying aid is added to the coacervated flavor capsules before spray-drying or dewatering. This drying aid has the effect of lubricating the spray-dried, or otherwise dried, capsules and provides for uniform distribution of the capsules.

The coating layer, as prepared by coacervation, comprises one or more colloidal materials which must be hydrophilic, gellable and ionizable. Colloidal materials may be selected from the group consisting of gelatin, alginates, casein, gum arabic, carboxymethylcellulose, and the like and mixtures thereof. In a most preferred form, the colloidal material in the coating layer comprises gelatin.

The microencapsulation method is practiced usually by first forming a solution of a first colloidal material such as gelatin in water above its gelation temperature. Separately, a second colloidal material such as sodium carboxymethylcellulose is added to water to form a clear solution. The two solutions are then mixed and the temperature is reduced whereupon the allium oil is mixed into the resulting solution and at a mixing speed to form the desired emulsion. Coacervation, or aggregation to uniformly distribute the colloidal materials around the flavoring oil droplets, is then carried out by diluting the emulsion with water, or adjusting the pH and allowing an elapsed time for the colloid to coat the oil droplets. Then, it is necessary to cross link the colloidal coating on the emulsified oil droplets and, in a preferred form, glutaraldehyde is used to cross link the gelatin coating surrounding the flavor oil droplets. Alum may also be used to cross link coated flavor oil capsules, as typically sizes up to about 600 microns, normally in a range of about 100 to 300 microns, may be prepared for spray drying.

It is preferred to add a drying aid to the slurry of microcapsules in aqueous medium prior to spray-drying or dewatering. Silicon dioxide is a preferred drying agent having a particle size of less than 400 mesh, but the fineness of the drying agent is not critical. The flavor capsules formed by protein coacervation are now ready for spray-drying and this may be accomplished by employing a spray-drying tower fitted with an air atomization nozzle for spraying counter-current to the heated air flow. The flavor capsules are delivered to the spray nozzle by a pump at a suitable rate. Atomization may be achieved in a number of ways. For example, air atomization, spinning disk or airless atomization may be employed to provide heat-stable and fracturable spray-dried free-flowing solid allium oil capsules.

It is also preferred to form a slurry of microcapsules having about 15% to about 40% by weight solids to achieve the benefits of the aqueous liquid flavor capsules such as flavor cost savings, easy handling and better flavor containment because of reduced flavor volatility in the water. The aqueous liquid flavor capsules are delivered by a pump at a suitable rate in processing to afford easy handling.

The allium oil capsules incorporated into the dough product do not affect dough rheology or finished product performance. Because the capsules are heat-stable, the allium oil does not react with the dough during dough processing, baking or cooking. Therefore, gluten depolymerization and the associated effects of rapid dough breakdown, decreased mix tolerance, increased dough extensibility and reduced gas-holding capacity do not occur. Furthermore, because the allium oil capsules are fracturable upon chewing, they provide a uniform and sustained release of the particular allium flavor. Customized blends of allium oil capsules and free allium material may be used where reduced mix time is desired in conjunction with flavoring of the dough product.

The allium oil capsules are incorporated into the flour or dough products in an effective flavor amount. Typically, this amount is about 1% by weight of the dough, or about 0.5% by weight of the dry flour mix in dry mix applications, for example, dry mixes packaged for rehydration and microwave cooking by the consumer. The amount of oil capsules also may be varied to suit the particular application.

The following examples are provided by way of illustration, and are not intended to limit the scope of the invention.

EXAMPLES

Example 1

An experiment was conducted to determine the effect of garlic oil on dough rheology when incorporated into a dough using a variety of flavor delivery systems. The different systems tested include oil capsules formed by protein coacervation ("capsules"), spray-dried oil and free oil.

The flour used was a commercially milled hard red winter flour Containing 11.7% protein, 0.5% ash and 13.7% moisture. The flavor systems were added to the flour on a flour weight basis, at the following levels: 0.59% capsules, 1% spray-dried oil and 0.5% (v/w) free oil, with different levels being used in order to provide the same level of flavor oil in each of the mixes. In addition, a control dough was prepared without any flavor oil.

The mixograph and bread baking sections of the experiment contain two sets of data for the free oil system because one dough was prepared and baked at the same time as the doughs incorporating the capsules and spray-dried oil ("free oil 1") while another dough was prepared and baked one month later ("free oil 2"). However, all other rheological tests using free oil were run only with free oil 2.

METHODS

Mixograph

Mixograms were determined by AACC Method 54-40. A constant absorption of 60% (fwb) was used for all samples. All samples were run in duplicate.

Bread Baking

Bread was baked as pup loaves using the AACC Method 10-10B straight-dough procedure with the 90-minute fermentation schedule. The baking formula is given in Table I. All loaves were baked in triplicate. The capsules and spray-dried oil were added to separate samples of the dry ingredients prior to addition of water and mixing into a dough, while the free oil was added to a separate flour sample with the water. All loaves were mixed to optimum development.

TABLE I

| Pup Loaf Bread Formula | |
|---|---|
| Ingredient | Amount |
| Flour (14% mb) | 100.0 g |
| Sucrose* | 6.0 g |
| Nonfat dry milk | 4.0 g |
| Shortening | 3.0 g |
| Salt* | 1.5 g |
| Yeast | 2.0 g |
| Water** | 69.0 ml |
| $KBrO_3$ | 15 ppm |

*added in aqueous solution
**includes water in sucrose/salt aqueous solution

After cooling, the loaves were cut open and the crumb was designated as either under-oxidized (under), fully oxidized (full), or over-oxidized (over).

Extensigraph

Extensigrams were produced using AACC Method 54-10. Absorption was kept constant at 60% (fwb). Doughs were mixed to optimum and tested at 45, 90, and 135 minutes. All samples were run in duplicate with three test pieces per dough.

Rheofermentometer

Gas release was measured with the Chopin Rheofermentometer F2 (Paris, France). Doughs were mixed and tested as described in the instruction manual with the exception that 2.5 g instant dry yeast was used. The rheofermentometer F2 measures the $CO_2$ release potential of the dough by measuring the speed at which carbon dioxide gas is formed in the risen dough. The percentage of the total gas released during fermentation which is retained by the dough mass is reported as the retention coefficient.

Gasograph

The Gasograph 12 (Pullman, Wash.) was used to measure maximum gas production of the doughs to determine whether the garlic samples were inhibiting or stimulating yeast activity. The procedure followed was the procedure described by Rubenthaler et al. (1980)[1]. Two modifications were made: waterbath temperature was kept constant at 30° C. and 0.2 g instant dry yeast was used.

[1] Rubenthaler, G. L., Finney, P. L., Demaray, D. E., and Finney, K. F. 1980. Gasograph: Design, Construction, and Reproducibility of a Sensitive 12-Channel Gas Recording Instrument. Cereal Chem 57(3):212–216.

Data Analysis

Analysis of variance and least significant difference were computed using the Statistical Analysis System (SAS Institute, Cary, N.C.).

RESULTS AND DISCUSSION

Mixograph

Mixograms (FIG. 1) show that the addition of spray-dried oil and free oil caused the dough to break down very rapidly. The addition of the capsules, however, did not affect dough mixing.

Bread Baking

Baking data are given in Table II. The addition of spray-dried oil and free oil significantly decreased mix time and had an oxidizing effect on the bread crumb. The capsules, however, did not affect mix time or the bread crumb. The spray-dried oil and free oil 1 significantly (p=0.05) decreased loaf volume from the control, while the capsules and free oil 2 did not affect volume.

TABLE II

| | Baking Data | | |
|---|---|---|---|
| Sample | Mix Time (min)[a] | Loaf Volume (cc)[a] | Crumb Characteristics |
| Control | 4.0[a] | 912 ± 27[a] | full |
| Free Oil 1 | 3.5[b] | 838 ± 8[c] | over |
| Free Oil 2 | 3.5[b] | 892 ± 8[ab] | over |
| Spray-dried oil | 3.5[b] | 880 ± 7[b] | over |
| Capsules | 4.0[a] | 905 ± 21[ab] | full |

[a]values within a column followed by different letters are significantly different (p = 0.05)

Extensigraph

FIG. 2 shows dough resistance to extension. Both the spray-dried oil and free oil 2 samples showed decreased resistance relative to the control, which may account for the decreased loaf volume and other deleterious changes in bake performance shown in Table 2. However, this decreased resistance to extension was prevented in the samples containing capsules. In fact, at 90 minutes and 135 minutes, the capsule-containing doughs showed increased resistance to extension relative to all other samples, including the control.

Figure 3:
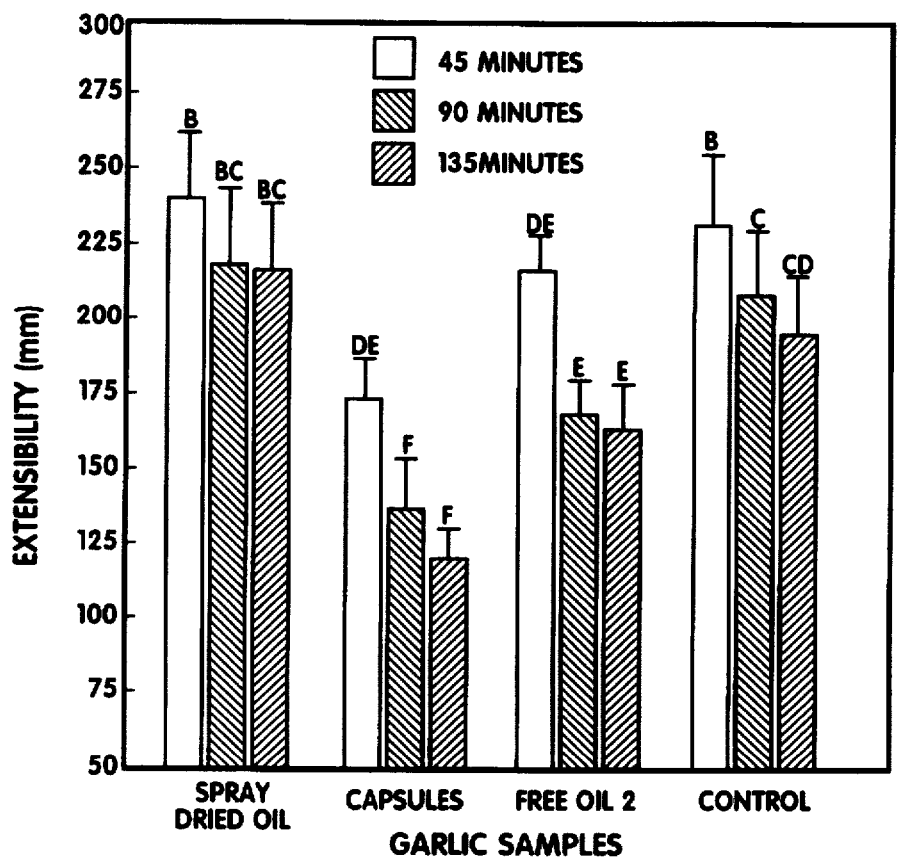

These favorable results for the capsule-containing samples are confirmed by the dough extensibility results shown in FIG. 3, where dough samples employing the capsules showed reduced extensibility at all time periods.

Rheofermentometer

Gas release data is given in Table III.

TABLE III

Gas Release Data

| Sample | Retention Coefficient (%) |
| --- | --- |
| Control | 80.3 |
| Spray-dried oil | 85.0 |
| Capsules | 82.0 |
| Free oil 2 | 83.8 |

The percentage of gas retained by the fermenting doughs was not significantly affected by the garlic samples.

Gasograph

Maximum gas production of the doughs during fermentation is given in Table IV.

TABLE IV

Maximum Gas Production

| Sample | Gas Production (GU) |
| --- | --- |
| Control | 100 |
| Spray-dried oil | 100 |
| Capsules | 99 |
| Free Oil 2 | 98 |

The ability of the yeast to produce carbon dioxide gas during fermentation was not affected by the addition of garlic.

Example 2

Deep Fat Fried Bread Dough

Heat-stable and fracturable allium oil microcapsules formed by protein coacervation are mixed into bread dough either as a solution (e.g., aqueous liquid) or as a powder (e.g., spray-dried) in an amount of about 0.25% to 1% by weight of the dough. The bread dough is then baked and may be separated into cubes. The cubes are then deep fat fried at about 375° F. for about 30 seconds.

Example 3

Dry Bread Mix for Microwaving

A dry mix for bread is formulated by mixing 51% flour, 6% sugar, 1% salt, 1% yeast and 1% emulsifier for addition to 40% water for rehydration. Allium oil capsules are incorporated into the dry mix at about 1% by weight to provide a flavored dry mix for rehydration by the customer and microwave cooking. The flavor microcapsules are prepared as described above. During microwave cooking of the rehydrated dry mix in the formation of bread, the allium oil is protected against flavor loss by microwave cooking because of the heat-stable capsules.

Example 4

Baked Bread

A chemically leavened or yeast leavened bread is formulated containing approximately 50% flour, 6% sugar, 1% salt, 40% water and 1% yeast or a chemical leavening system. In this example, allium oil capsules formed by protein coacervation are incorporated at about 1% by weight or at a suitable level into the dough. During fermentation and subsequent baking for about 20-60 minutes at about 325°–370° F., the flavor oil is protected against baking temperatures.

Other modifications of this invention may be made without departing from its scope as will be understood to a person of ordinary skill in the art.

What is claimed is:

1. An allium flavored flour comprising:

flour; and heat-stable, fracturable, allium oil capsules of discrete droplets of allium oil microencapsulated in a protein coating, said allium oil capsules in admixture with said flour in an amount sufficient for flavoring when said allium flavored flour is formed into a dough without substantially affecting the rheology of said dough.

2. The flavored flour of claim 1 further including a chemical leavening system.

3. The flavored flour of claim 1 further comprising free allium material in admixture with said flavored flour in an amount sufficient to reduce the mix time required to develop said dough.

4. The flavored flour of claim 3 wherein said free allium material is selected from the group consisting of garlic, onion, chive, leek, shallot, scallion and combinations thereof.

5. The flavored flour of claim 3 wherein said free allium material is garlic.

6. The flavored flour of claim 3 wherein said free allium material is selected from the group consisting of an oil, oleoresin, extract, essence, puree and combinations thereof.

7. The flavored flour of claim 1 wherein the allium oil is selected from the group consisting of garlic, onion, chive, leek, shallot, scallion and combinations thereof.

8. The flavored flour of claim 1 wherein the allium oil is garlic.

9. A method of making an allium flavored flour dough product comprising the steps of:

mixing flour and heat-stable, fracturable, allium oil capsules of discrete droplets of allium oil microencapsulated in a protein coating, said allium oil capsules in an amount sufficient to flavor a dough; and mixing said flour and capsules with water for a time sufficient to develop said dough where said allium oil does not substantially affect the rheology of said dough.

10. The method of claim 9 wherein said dough ingredients further include yeast.

11. The method of claim 9 wherein said dough ingredients further include a chemical leavening system.

12. The method of claim 9 wherein said dough ingredients further comprise free allium material in an amount sufficient to reduce the mix time required to develop said dough.

13. The method of claim 12 wherein said free allium material is selected from the group consisting of garlic, onion, chive, leek, shallot, scallion and combinations thereof.

14. The method of claim 12 wherein said free allium material is garlic.

15. The method of claim 12 wherein said free allium material is selected from the group consisting of an oil, oleoresin, extract, essence, puree and combinations thereof.

16. The method of claim 9 wherein the allium oil is selected from the group consisting of garlic, onion, chive, leek, shallot, scallion and combinations thereof.

17. The method of claim 9 wherein the allium oil is garlic.

* * * * *